Jan. 26, 1932.  W. A. FRASER  1,842,599

CASE FOR EYEGLASSES AND THE LIKE

Filed March 10, 1930

INVENTOR
W. A. FRASER
BY
Fetherstonhaugh & Co
ATTORNEYS.

Patented Jan. 26, 1932

1,842,599

UNITED STATES PATENT OFFICE

WILLIAM ALEXANDER FRASER, OF TORONTO, ONTARIO, CANADA

CASE FOR EYEGLASSES AND THE LIKE

Application filed March 10, 1930. Serial No. 434,710.

My invention relates to improvements in cases for eye glasses and the like, and the object of the invention is to devise a case simple and cheap to manufacture, which will dispense with any form of cover and which is, therefore, open at all times to permit easy removal of the glasses, and yet will releasably grip the glasses therein to prevent their inadvertently slipping from the case and permit of their instant release and removal whenever desired and by one hand of the operator when necessary, and it consists essentially of the arrangement and construction of parts all as hereinafter more particularly explained.

In the drawings like characters of reference indicate corresponding parts in each figure.

1 indicates an oblong case open at one end and formed of leather or any other suitable material or fabric. 2 is a resilient plate of thin metal which is inserted in the case through the open end thereof so that the longitudinal edges of the plate fit against and frictionally engage the interior of the case at each longitudinal edge. The plate 2 is preferably provided at 3 with an inturned edge portion forming a rounded edge at the point where the pressure of the fingers of the operator is exerted. 4 indicates a pair of eye glasses which are inserted in the case by being passed longitudinally through the open end thereof.

Figure 1:
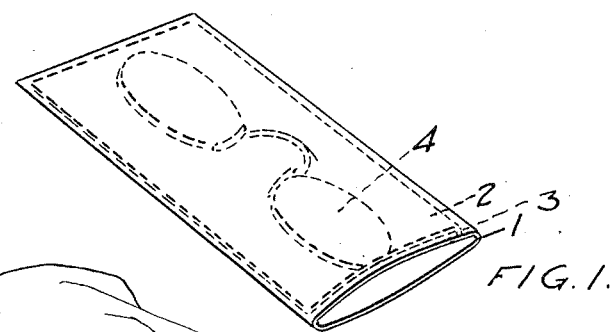
Fig. 1 is a perspective view of my case showing the spring insert plate and eye glasses by dotted lines therein.
Figure 2:
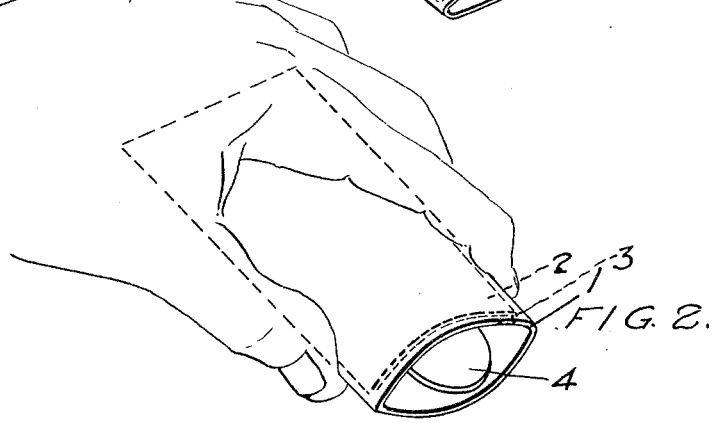
Fig. 2 is a view of the case showing it in the position it assumes when the eye glasses are released for removal.

When it is desired to either insert the glasses in the case, the case is gripped between the thumb and fingers of the user, as illustrated in Fig. 2, and the longitudinal edges adjacent the mouth or open end of the casing squeezed together so as to bend the resilient plate 2 into arch form and thereby spread the side edges of the casing opening apart and also the walls gradually towards such opening.

The glasses are then inserted in the case and the pressure relieved, the plate 2 will then spring to its normal position drawing the sides of the casing together exerting a gripping tension upon the eye glasses interposed therebetween preventing any longitudinal movement within the casing. The spring plate 2 exerts a firm pressure against one side of the glasses forcing them against the relatively soft fabric of the opposing casing wall. By this means the eye glasses are firmly and frictionally gripped so as to be held within the casing.

When it is desired to remove the eye glasses all it is necessary to do is to again grip the casing as before described and thereby relieve the pressure of the plate 2 upon the eye glasses and by tilting the casing to an incline position with the open end downward, the eye glasses are readily slipped from the casing into the other hand of the operator.

Although I have described my device as applied to the holding of eye glasses it will, of course, be understood that spectacles may be similarly held or, in fact, any other article desired to be held in a similar form of casing.

If desired the face of the plate 2 may be covered with fabric or leather so as to increase the frictional contact between the plate and the glasses, and at the same time, form a softer surface against which the glasses bear.

Figure 6:
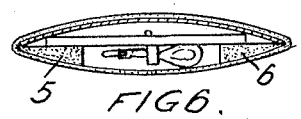
Fig. 6 is an enlarged transverse sectional view through my eye glass case showing a modification.
Figure 3:
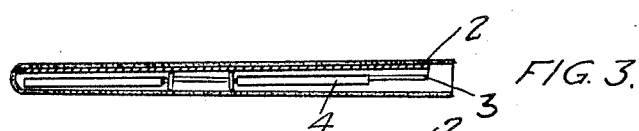
Fig. 3 is a longitudinal sectional view through Fig. 1.
Figure 4:
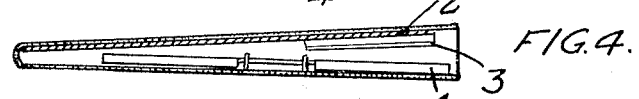
Fig. 4 is a longitudinal sectional view through the case as illustrated in Fig. 1.
Figure 5:
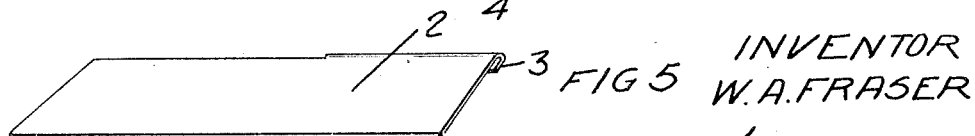
Fig. 5 is a perspective detail of the spring insert plate.

If it is found that too great pressure is exerted upon the nose piece and nose grips, spacing means such as indicated at 5 and 6 may be inserted extending longitudinally of the case and secured either to the flexible wall or to the spring plate 2 as illustrated in Fig. 6. These spacing strips are shown secured to the flexible wall of the case and serve to support the lenses of the glasses in spaced relation with such wall so that there is no excessive bearing pressure upon the nose piece.

What I claim as my invention is:

A case for eye glasses and the like comprising a casing body formed of flexible material open at one end, a resilient plate fitting the casing and extending from side to side and from end to end and between which and the opposite wall of the casing the eye glasses are gripped.

WILLIAM ALEXANDER FRASER.